(12) United States Patent
Gao et al.

(10) Patent No.: US 12,267,168 B2
(45) Date of Patent: Apr. 1, 2025

(54) METHOD, DEVICE AND COMPUTER STORAGE MEDIUM FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 17/788,153

(22) PCT Filed: Dec. 23, 2019

(86) PCT No.: PCT/CN2019/127424
§ 371 (c)(1),
(2) Date: Jun. 22, 2022

(87) PCT Pub. No.: WO2021/127840
PCT Pub. Date: Jul. 1, 2021

(65) Prior Publication Data
US 2024/0031067 A1    Jan. 25, 2024

(51) Int. Cl.
*H04L 1/1607* (2023.01)
*H04L 5/00* (2006.01)
*H04W 56/00* (2009.01)

(52) U.S. Cl.
CPC .......... *H04L 1/1671* (2013.01); *H04L 5/0044* (2013.01); *H04L 5/0053* (2013.01); *H04W 56/0045* (2013.01)

(58) Field of Classification Search
CPC ... H04L 1/1671; H04L 5/0044; H04L 5/0053; H04W 56/0045
See application file for complete search history.

(56) References Cited

U.S. PATENT DOCUMENTS

2015/0131579 A1    5/2015  Li et al.
2022/0248424 A1    8/2022  Yoshioka et al.
(Continued)

FOREIGN PATENT DOCUMENTS

CN    104170297 A      11/2014
WO    2016/182052 A1   11/2016
(Continued)

OTHER PUBLICATIONS

JP Office Action for JP Application No. 2022-538839, mailed on Dec. 12, 2023 with English Translation.
(Continued)

*Primary Examiner* — Derrick V Rose
(74) *Attorney, Agent, or Firm* — Sughrue Mion, PLLC

(57) ABSTRACT

Embodiments of the present disclosure relate to methods, devices and computer storage media for communication. A method comprises transmitting, from a first device to a second device, a plurality of repetitions for a physical channel for scheduling a communication between the first device and the second device, wherein the plurality of PDCCH repetitions indicate same offset information for the communication; determining, based on the same offset information and index information about a repetition of the plurality of repetitions, a time offset between the repetition and the communication; and performing, based on the time offset, the communication with the second device. Embodiments of the present disclosure enable both the network device and the terminal device to obtain, from the physical channel repetitions, the real time offset for a corresponding communication and improve reliability and robustness for the physical channel.

15 Claims, 5 Drawing Sheets

(56) References Cited

U.S. PATENT DOCUMENTS

2022/0408470 A1* 12/2022 Jung .................... H04W 72/23
2023/0007524 A1* 1/2023 Wang .................... H04L 5/0091

FOREIGN PATENT DOCUMENTS

| WO | 2017/153118 | A1 | 9/2017 |
| WO | 2019/186737 | A1 | 10/2019 |
| WO | 2020/261510 | A1 | 12/2020 |

OTHER PUBLICATIONS

NTT Docomo, Inc., Physical Layer Enhancements for NR URLLC, 3GPP TSG RAN WG1 #94 R1-1809163, 2018.
LG Electronics, Discussion on PDCCH repetition for URLLC, 3GPP TSG RAN WG1 #92b R1-1804571, 2018.
Intel Corporation, On NR PDCCH repetitions for URLLC, 3GPP TSG RAN WG1 #92b R1-1804741, 2018.
JP Office Action for JP Application No. 2022-538839, mailed on Jun. 27, 2023 with English Translation.
CATT, Considerations on multi-TRP/panel transmission, 3GPP TSG RAN WG1 #98b R1-1910349, Oct. 2019.
NTT Docomo, Inc, Enhancements on multi-TRP/panel transmission, 3GPP TSG RAN WG1 #98b R1-1911184, Oct. 2019.
International Search Report for PCT/CN2019/127424 dated Jun. 24, 2020 (PCT/ISA/210).
Written Opinion of the International Search Report for PCT/CN2019/127424 dated Jun. 24, 2020 (PCT/ISA/210).
Extended European Search Report dated Oct. 25, 2022 in European Application No. 19957627.3.
Office Action dated Dec. 21, 2022 issued by the Indian Patent Office in Indian Application No. 202217039944.
NTT Docomo, Inc, "Enhancements on multi-TRP/panel transmission", 3GPP TSG RAN WG1 #98bis, 2019, R1-1911184, Chongqing, China, Oct. 14-20 (32 pages total).
AT&T, "Enhancements on Multi TRP Transmission", 3GPP TSG RAN WG1 #99, 2019, R1-1912844, Reno, NV, Nov. 18-22, pp. 1-8 (8 pages total).

* cited by examiner

METHOD, DEVICE AND COMPUTER STORAGE MEDIUM FOR COMMUNICATION

CROSS REFERENCE TO RELATED APPLICATIONS

This application is a National Stage of International Application No. PCT/CN2019/127424 dated Dec. 23, 2019.

TECHNICAL FIELD

Embodiments of the present disclosure generally relate to the field of telecommunication, and in particular, to methods, devices and computer storage media for communication.

BACKGROUND

In the 3GPP meeting RAN #86, enhancements on the support for multi-Transmission and Reception Point (multi-TRP) deployment have been discussed. For example, it has been proposed to identify and specify features to improve reliability and robustness for channels (such as, Physical Downlink Control Channel (PDCCH), Physical Uplink Shared Channel (PUSCH) and Physical Uplink Control Channel (PUCCH)) other than Physical Downlink Shared Channel (PDSCH) using multi-TRP and/or multi-panel with Release 16 reliability features as baseline. It has also been proposed to identify and specify features to enable inter-cell multi-TRP operations. It has also been proposed to evaluate and specify enhancements for simultaneous multi-TRP transmission with multi-panel reception.

In the 3GPP meeting RAN1 #98-99, It has been proposed to support PDCCH repetitions to improve reliability and robustness for the PDCCH. That is, a PDCCH signal (such as, downlink control information) can be repeatedly transmitted from a network device to a terminal device more than once, so as to improve reliability and robustness for the PDCCH. However, no detail about PDCCH repetitions has been discussed or specified.

SUMMARY

In general, example embodiments of the present disclosure provide methods, devices and computer storage media for communication.

In a first aspect, there is provided a method of communication. The method comprises: transmitting, from a first device to a second device, a plurality of repetitions for a physical channel for scheduling a communication between the first device and the second device, wherein the plurality of repetitions indicate same offset information for the communication; determining, based on the same offset information and index information about a repetition of the plurality of repetitions, a time offset between the repetition and the communication; and performing, based on the time offset, the communication with the second device.

In a second aspect, there is provided a method of communication. The method comprises: receiving, from a first device and at a second device, a repetition for a physical channel for scheduling a communication between the first device and the second device, wherein the first device transmits a plurality of repetitions for the physical channel to the second device, and the plurality of repetitions comprise the received repetition and indicate same offset information for the communication; determining, based on the same offset information and index information about the repetition, a time offset between the repetition and the communication; and performing, based on the time offset, the communication with the first device.

In a third aspect, there is provided a device of communication. The device comprises a processor and a memory coupled to the processor. The memory stores instructions that when executed by the processor, cause the device to perform actions. The actions comprise: transmitting, from the device to a further device, a plurality of repetitions for a physical channel for scheduling a communication between the device and the further device, wherein the plurality of repetitions indicate same offset information for the communication; determining, based on the same offset information and index information about a repetition of the plurality of repetitions, a time offset between the repetition and the communication; and performing, based on the time offset, the communication with the further device.

In a fourth aspect, there is provided a device of communication. The device comprises a processor and a memory coupled to the processor. The memory stores instructions that when executed by the processor, cause the device to perform actions. The actions comprise: receiving, from a further device, a repetition for a physical channel for scheduling a communication between the device and the further device, wherein the further device transmits a plurality of repetitions for the physical channel to the device, and the plurality of repetitions comprise the received repetition and indicate same offset information for the communication; determining, based on the same offset information and index information about the repetition, a time offset between the repetition and the communication; and performing, based on the time offset, the communication with the further device.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1A:
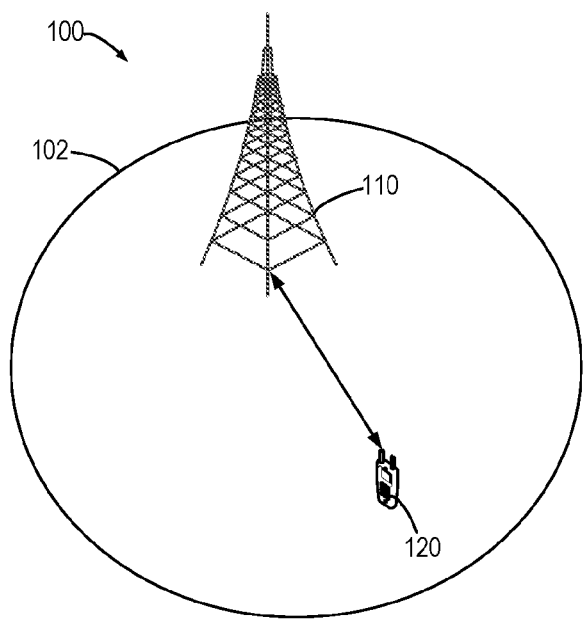
FIGS. 1A-1B illustrate an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' highest,"minimum," 'maximum,' or the like. It will be appreciated that such descriptions are intended to indicate that a selection among many used functional alternatives can be made, and such selections need not be better, smaller, higher, or otherwise preferable to other selections.

As described above, in the 3GPP meeting RAN1 #98-99, it has been proposed to support PDCCH repetitions to improve reliability and robustness for the PDCCH. That is, a PDCCH signal (such as, downlink control information) can be repeatedly transmitted from a network device to a terminal device more than once, where each transmission of the PDCCH signal can be referred to as one PDCCH repetition. However, no detail about PDCCH repetitions has been discussed or specified. In current 3GPP specifications for New Radio access (NR), there is no specification about PDCCH repetitions, but some details related to PDCCH are specified.

In the 3GPP specification TS 38.212, it is specified that Downlink Control Information (DCI) format 0_1 is used for PUSCH scheduling in one cell. The information transmitted by means of the DCI format 0_1 includes at least the following:

Time domain resource assignment—0, 1, 2, 3, or 4 bits as defined in Subclause 6.1.2.1 of the 3GPP specification TS 38.214. The bit width for this field is determined as $\lceil \log_2 (I) \rceil$ bits, where I is the number of entries in the higher layer parameter pusch-TimeDomainAllocationList if the higher layer parameter is configured; otherwise I is the number of entries in the default table.

SRS request—2 bits as defined by Table 7.3.1.1.2-24 for UEs not configured with supplementary Uplink (SUL) in ServingCellConfig in the cell; 3 bits for UEs configured with supplementary Uplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of the 3GPP specification TS 38.214.

CSI request—0, 1, 2, 3, 4, 5, or 6 bits determined by higher layer parameter report TriggerSize.

In the 3GPP specification TS 38.212, it is specified that DCI format 1_1 is used for PDSCH scheduling in one cell. The information transmitted by means of the DCI format 1_1 includes at least the following:

Time domain resource assignment—0, 1, 2, 3, or 4 bits as defined in Subclause 5.1.2.1 of the 3GPP specification TS 38.214. The bit width for this field is determined as $\lceil \log_2 (I) \rceil$ bits, where I is the number of entries in the higher layer parameter pdsch-TimeDomainAllocationList if the higher layer parameter is configured; otherwise I is the number of entries in the default table.

Zero power (ZP) CSI-RS trigger—0, 1, or 2 bits as defined in Subclause 5.1.4.2 of the 3GPP specification TS 38.214. The bit width for this field is determined as $\lceil \log_2(n_{ZP}30\ 1) \rceil$ bits, where $n_{ZP}$ is the number of ZP CSI-RS resource sets configured by the higher layer.

PDSCH-to-HARQ feedback timing indicator—0, 1, 2, or 3 bits as defined in Subclause 9.2.3 of the 3GPP specification TS 38.213. The bit width for this field is determined as $\lceil \log_2(I) \rceil$ bits, where I is the number of entries in the higher layer parameter dl-DataToUL-ACK.

SRS request—2 bits as defined by Table 7.3.1.1.2-24 for UEs not configured with supplementary Uplink (SUL) in ServingCellConfig in the cell; 3 bits for UEs configured with supplementary Uplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of the 3GPP specification TS 38.214.

In the 3GPP specification TS 38.214, resource allocation in time domain to be used for PDSCH is specified. When a user equipment (UE) is scheduled to receive PDSCH by Downlink Control Information (DCI), the time domain resource assignment filed value m of the DCI may provide a row index m+1 to an allocation table. The determination of the used resource allocation table is defined in Subclause 5.1.2.1 of the 3GPP specification TS 38.214. The indexed row defines the slot offset $K_0$, the start and length indicator SLIV, or directly the start symbol S and the allocation length L, and the PDSCH mapping type to be assumed in the PDSCH reception.

TABLE 5.1.2.1-1

Valid S and L combinations

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

Note 1:
S = 3 is applicable only if dmrs-TypeA-Position = 3

In the 3GPP specification TS 38.214, resource allocation in time domain to be used for PUSCH is specified. When a user equipment (UE) is scheduled to transmit PUSCH by Downlink Control Information (DCI), the time domain resource assignment filed value m of the DCI may provide a row index m+1 to an allocation table. The determination of the used resource allocation table is defined in Subclause 6.1.2.1 of the 3GPP specification TS 38.214. The indexed row defines the slot offset $K_0$, the start and length indicator SLIV, or directly the start symbol S and the allocation length L, and the PUSCH mapping type to be assumed in the PUSCH transmission.

TABLE 6.1.2.1-1

Valid S and L combinations

| PUSCH mapping type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 11} | {1, ..., 12} | {1, ..., 12} |

In the 3GPP specification TS 38.211, the sequence generation for a Demodulation Reference Signal for PDCCH is specified. The UE shall assume the reference-signal sequence $\eta(m)$ for OFDM symbol l is defined by $$r_l(m) = \frac{1}{\sqrt{2}}(1 - 2 \cdot c(2m)) + j\frac{1}{\sqrt{2}}(1 - 2 \cdot c(2m+1)) \quad (1)$$

where the pseudo-random sequence c(i) is defined in clause 5.2.1. The pseudo-random sequence generator shall be initialized with $$c_{init} = (2^{17}(N_{symb}^{slot}n_{s,f}^{\mu}+l+1)(2N_{ID}+1)+2N_{ID}) \bmod 2^{31} \quad (2)$$

where l is the OFDM symbol number within the slot, and $n_{s,f}^{\mu}$ is the slot number within a frame. $N_{ID} \in \{0,1, \ldots, 65535\}$ is given by the higher-layer parameter pdcch-DMRS-ScramblingID if provided; otherwise, $N_{ID} = N_{ID}^{cell}$.

In order to support PDCCH repetitions, several problems need to be solved. For example, DCI transmitted via the PDCCH can be used for scheduling PDSCH transmission to a terminal device, triggering transmission of an aperiodic Channel State Information-Reference Signal (A-CSI-RS) to a terminal device, indicating a time/frequency resource for an aperiodic ZP CSI-RS, scheduling PUSCH transmission from a terminal device, triggering transmission of an aperiodic Sounding Reference Signal (SRS) from a terminal device, triggering transmission of an aperiodic Channel State Information (CSI) report from a terminal device, or triggering a Hybrid Automatic Repeat Request (HARQ) feedback from a terminal device. However, if repetitions for the PDCCH are enabled, it is unclear how to provide the offset indication for the PDSCH transmission to a terminal device, the transmission of the A-CSI-RS to a terminal device, the indication of the time/frequency resource for the aperiodic ZP CSI-RS to a terminal device, the PUSCH transmission from a terminal device, the transmission of the aperiodic SRS from a terminal device, the transmission of the aperiodic CSI report from a terminal device or the HARQ feedback from a terminal device. Further, if the combination of PDCCH repetitions is expected, the offset values indicated in different PDCCH repetitions should be the same. However, if the offset values indicated in different PDCCH repetitions are the same, it is unclear how to indicate the real time offset for corresponding channel/signal transmission and/or reception.

Embodiments of the present disclosure provide a solution to solve the problems above and/or one or more of other potential problems. This solution enables both a network device and a terminal device to obtain, from the physical channel repetitions, the real time offset for a corresponding communication and improve reliability and robustness for the physical channel. Since the payloads of different physical channel repetitions are the same, the combination of the physical channel repetitions can be achieved, so as to improve reliability and robustness for the physical channel. Principle and implementations of the present disclosure will be described in detail below with reference to FIGS. 1A-7.

FIG. 1A shows an example communication network 100 in which embodiments of the present disclosure can be implemented. The network 100 includes a network device 110 and a terminal device 120 served by the network device 110. The network 100 may provide one or more serving cells 102 to serve the terminal device 120. It is to be understood that the number of network devices, terminal devices and/or serving cells is only for the purpose of illustration without suggesting any limitations to the present disclosure. The network 100 may include any suitable number of network devices, terminal devices and/or serving cells adapted for implementing implementations of the present disclosure.

As used herein, the term "terminal device" refers to any device having wireless or wired communication capabilities.

Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device 120 may be connected with a first network device and a second network device (not shown in FIG. 1A). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling, Medium Access Control (MAC) control element (CE) or Downlink Control Information (DCI).

In the communication network 100 as shown in FIG. 1A, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

In some embodiments, for downlink transmissions, the network device 110 may transmit control information via a PDCCH and/or transmit data via a PDSCH to the terminal device 120. Additionally, the network device 110 may transmit one or more reference signals (RSs) to the terminal device 120. The RS transmitted from the network device 110 to the terminal device 120 may also referred to as a "DL RS". Examples of the DL RS may include but are not limited to Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on.

In some embodiments, for uplink transmissions, the terminal device 120 may transmit control information via a PUCCH and/or transmit data via a PUSCH to the network device 110. Additionally, the terminal device 120 may transmit one or more RSs to the network device 110. The RS transmitted from the terminal device 120 to the network device 110 may also referred to as a "UL RS". Examples of the UL RS may include but are not limited to DMRS, CSI-RS, SRS, PTRS, fine time and frequency TRS and so on.

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

The network device 110 (such as, a gNB) may be equipped with one or more TRPs or antenna panels. As used herein, the term "TRP" refers to an antenna array (with one or more antenna elements) available to the network device located at a specific geographical location. For example, a network device may be coupled with multiple TRPs in different geographical locations to achieve better coverage. The one or more TRPs may be included in a same serving cell or different serving cells.

It is to be understood that the TRP can also be a panel, and the panel can also refer to an antenna array (with one or more antenna elements). Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

Figure 1B:
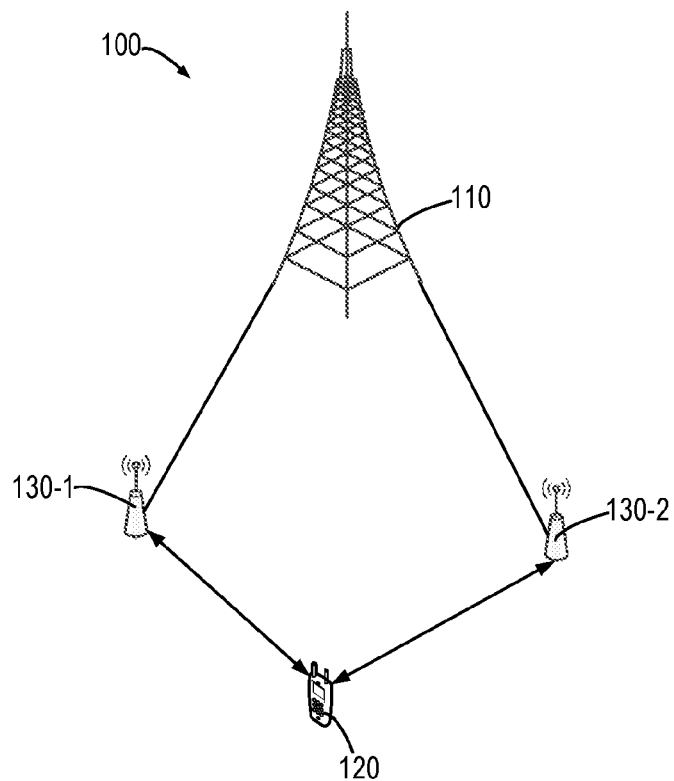

FIG. 1B shows an example scenario of the network 100 as shown in FIG. 1A. As shown in FIG. 1B, for example, the network device 110 may communicate with the terminal device 120 via TRPs 130-1 and 130-2. In the following text, the TRP 130-1 may be also referred to as the first TRP, while the TRP 130-2 may be also referred to as the second TRP. The first and second TRPs 130-1 and 130-2 may be included in a same serving cell (such as, the cell 102 as shown in FIG. 1A) or different serving cells provided by the network device 110. Although some embodiments of the present disclosure are described with reference to the first and second TRPs 130-1 and 130-2 within a same serving cell provided by the network device 110, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

Figure 2:
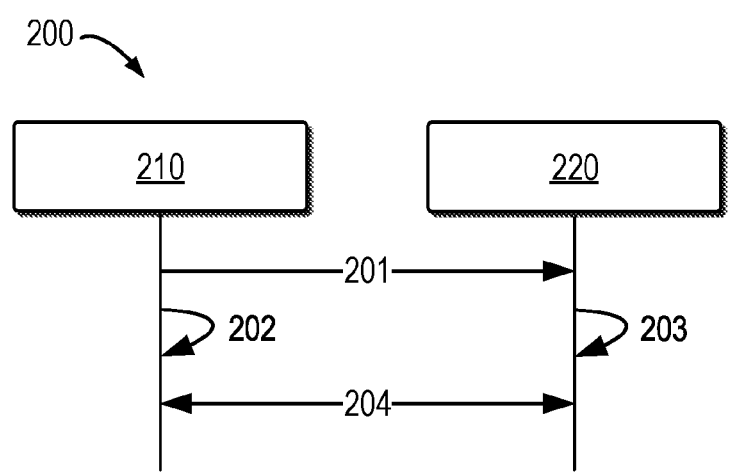
FIG. 2 is an example signaling chart showing an example process of communication in accordance with some embodiments of the present disclosure.

FIG. 2 illustrates an example signaling chart showing an example process 200 of communication in accordance with some embodiments of the present disclosure. As shown in FIG. 2, the process 200 may involve a first device 210 and a second device 220. In some embodiments, the first device 210 may be the network device 110 and the second device 220 may be the terminal device 120 as shown in FIG. 1A and/or FIG. 1B. Alternatively, in other embodiments, the first device 210 may be the terminal device 120 and the second device 220 may be the network device 110 as shown in FIG. 1A and/or FIG. 1B. It is to be understood that the process 200 may include additional acts not shown and/or may omit some acts as shown, and the scope of the present disclosure is not limited in this regard.

As shown in FIG. 2, the first device 210 may transmit 201, to the second device 220, a plurality of repetitions for a physical channel for scheduling a communication between the first device and the second device. In some embodiments, the plurality of repetitions may indicate same offset information for the communication. For example, the plurality of physical channel repetitions may indicate a same offset value K (where K is a non-negative integer, for example 0≤K≤64) for the communication. Correspondingly, the second device 220 may receive 201, from the first device 210, one or more of the plurality of repetitions for the physical channel. The first device 210 may determine 202, based on the same offset information (such as, the same offset value K) and index information (for example, an index value X) about a repetition of the plurality of repetitions, a time offset between the repetition and the communication. Similarly, the second device 220 may determine 203, based on the offset value (that is, the same offset value K) and index information (that is, the index value X) about the received repetition, a time offset between the received repetition and the communication. Then, the communication is performed 204 between the first device 210 and the second device 220 based on the determined time offset.

In some embodiments, the physical channel may comprise one of the following: a PDCCH, a PDSCH, a PUCCH, a PUSCH, or a Physical Random Access Channel (PRACH). For the purpose of discussion, in the following, some embodiments will be described with reference to the PDCCH as an example of the physical channel. When the physical channel is the PDCCH, for example, the first device 210 may be the network device 110 and the second device 220 may be the terminal device 120 as shown in FIG. 1A and/or FIG. 1B. It is to be understood that, this is merely for the purpose of illustration, without suggesting any limitation to the scope of the present disclosure.

In some embodiments, the network device 110 may transmit DCI via a PDCCH to the terminal device 120. The terminal device 120 may receive the DCI from the network device 110. The DCI may be used for scheduling or triggering a communication between the network device 110 and the terminal device 120, and/or indicating a time/frequency resource for the communication. In some embodiments, the communication may include transmission and/or reception of at least one of the following: a PDSCH signal, a PUSCH signal, a PUCCH signal, a CSI-RS, an aperiodic CSI-RS, a ZP CSI-RS, an aperiodic ZP CSI-RS, a SRS, an aperiodic SRS, a CSI report, an aperiodic CSI report, a HARQ feedback (acknowledgement or negative acknowledgement), and so on.

In some embodiments, there may be a time offset T (where T is a non-negative integer) between a start time of the PDCCH communication and a start time of the scheduled or triggered communication, or between an end time of the PDCCH communication and an end time of the scheduled or triggered communication. For example, T may be at least one of {0, 1, 2 . . . 336}. In some embodiments, the time offset T may be in terms of symbols, slots, sub-frames, sub-slots, frames or microseconds. For example, the time offset T may include one or more symbols, slots, sub-frames, sub-slots, frames or microseconds. In some embodiments, for the network device 110 and/or the terminal device 120, the time offset T may be a time interval between a start symbol for the PDCCH communication and a start symbol for the scheduled or triggered communication, or a time interval between an end symbol for the PDCCH transmission and an end symbol for the communication. For example, the time offset T may be the time interval between the start symbol for the PDCCH communication and the start symbol for communicating at least one of the following: a PDSCH signal, a PUSCH signal, a PUCCH signal, a CSI-RS, an aperiodic CSI-RS, a ZP CSI-RS, an aperiodic ZP CSI-RS, a SRS, an aperiodic SRS, a CSI report, an aperiodic CSI report, a HARQ feedback (acknowledgement or negative acknowledgement), and so on. For another example, the time offset T may be the time interval between the end symbol for the PDCCH communication and the end symbol for communicating at least one of the following: a PDSCH signal, a PUSCH signal, a PUCCH signal, a CSI-RS, an aperiodic CSI-RS, a ZP CSI-RS, an aperiodic ZP CSI-RS, a SRS, an aperiodic SRS, a CSI report, an aperiodic CSI report, a HARQ feedback (acknowledgement or negative acknowledgement), and so on.

In some embodiments, if repetitions for PDCCH are enabled, there may be a time duration D (where D is a non-negative integer) for the PDCCH repetitions. For example, D may be at least one of {0, 1, 2 . . . 336}. In some embodiments, the time duration D may be in terms of symbols, slots, sub-frames, sub-slots, frames or microseconds. For example, the time duration D may include one or more symbols, slots, sub-frames, sub-slots, frames or microseconds. In some embodiments, the network device 110 may configure or indicate the time duration D to the terminal device 120. For example, the time duration D may be configured or indicated to the terminal device 120 via any of the following: RRC signaling, MAC CE or DCI. In some embodiments, the network device 110 may transmit a plurality of PDCCH repetitions within the time duration D. In some embodiments, the value of D may be pre-defined and/or fixed. That is, there may be no need of signaling for configuring the value of D.

In some embodiments, the network device 110 may configure or indicate, to the terminal device 120, a number of repetitions for PDCCH. For example, the number of repetitions for PDCCH may be represented as B, where B is a non-negative integer. For example, B may be at least one of {1, 2 . . . 64}). In some embodiments, the network device 110 may transmit the PDCCH repetitions to the terminal device 120 for scheduling a communication between the network device 110 and the terminal device 120. In some embodiments, as described above, the communication may include transmission and/or reception of at least one of the following: a PDSCH signal, a PUSCH signal, a PUCCH signal, a CSI-RS, an aperiodic CSI-RS, a ZP CSI-RS, an aperiodic ZP CSI-RS, a SRS, an aperiodic SRS, a CSI report, an aperiodic CSI report, a HARQ feedback (acknowledgement or negative acknowledgement), and etc. In some embodiments, the B PDCCH repetitions may be transmitted by the network device 110 or received by the terminal device 120 within the time duration D. In some embodiments, the terminal device 120 may transmit a capability report on the number of PDCCH repetitions to the network device 110.

In some embodiments, the network device 110 and/or the terminal device 120 may determine the time offset T based on the offset value K indicated by DCI and an index value X. In some embodiments, the index value X may be determined based on at least one of the following: an index of a PDCCH repetition within the plurality of PDCCH repetitions, a relative slot index for the PDCCH repetition within the time duration D, a slot index for the PDCCH repetition within a frame or sub-frame.

In some embodiments, the plurality of PDCCH repetitions (for example, B PDCCH repetitions) may be transmitted from the network device 110 to the terminal device 120 during the time duration D. For example, the time duration may include M slots, where M is an integer and 1≤M≤64. In some embodiments, within the time duration D or the M slots, the number of PDCCH candidates in different slots may be the same or different. In some embodiments, within the time duration D or the M slots, there may be at least one slot in which there may be at least one PDCCH candidate. In some embodiments, within the time duration D or the M slots, there may be at least one slot in which there may be no PDCCH candidate. In some embodiments, the time offset T between a given PDCCH repetition (such as, transmission or reception of the given PDCCH repetition) and the communication can be determined as one of the following: K+X, K−X, K+X+1, K+X−1, K−X−1, K+M−X+1 or K+M−X−1 slots, where X represents a relative slot index within the M slots and K represents the offset value indicated in the PDCCH repetition. For example, 0≤X≤M−1 or 1≤X≤M. In some embodiments, for the a-th slot (for example, a is a non-negative integer and 1≤a≤M) in the M slots, X may be one of the following: a−1, a, M−a or M−a+1. For example, for the 1st slot (that is, a=1) in the M slots, X may be one of the following: 0, 1, M or M−1. For another example, for the 2nd slot (that is, a=2) in the M slots, X may be one of the following: 1, 2, M−1 or M−2. For another example, for the last slot (that is, a=M) in the M slots, X may be one of the following: M, M−1, 0 or 1.

Figure 3:
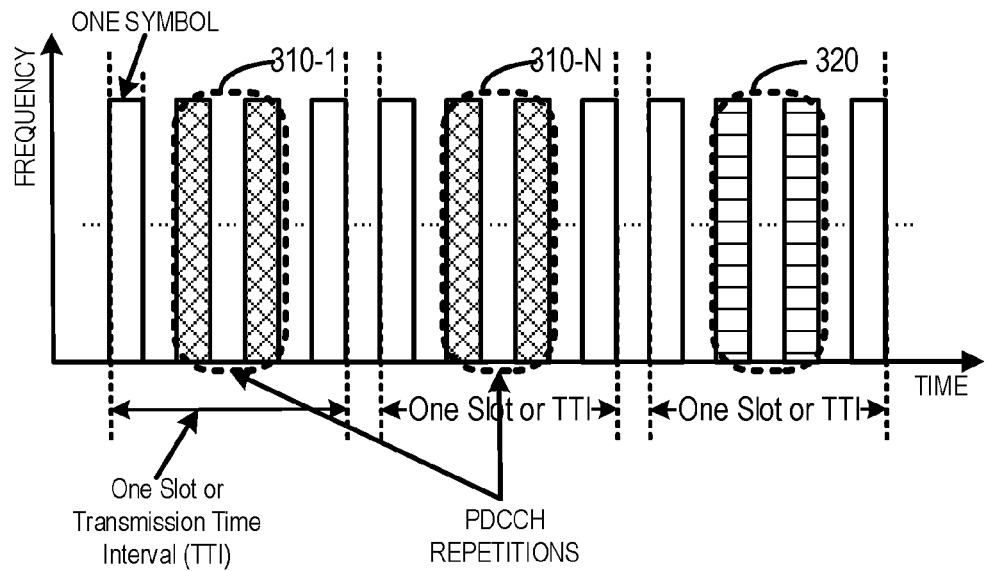
FIG. 3 illustrates an example of embodiments of the present disclosure.

FIG. 3 illustrates an example of such embodiments. As shown in FIG. 3, for example, the network device 110 may transmit, to the terminal device 120, a plurality of PDCCH repetitions 310-1, 310-2 . . . 310-N (collectively or individually referred to as "PDCCH repetition(s) 310") for scheduling a communication 320, where N is an integer and 1≤N≤64. In some embodiments, the PDCCH repetitions 310-1, 310-2 . . . 310-N may be indexed with 0, 1 . . . N−1 respectively. Alternatively, in some embodiments, the PDCCH repetitions 310-1, 310-2 . . . 310-N may be indexed with 1, 2 . . . N respectively. For example, in this event, the time offset T between a PDCCH repetition 310 (such as, transmission or reception of the PDCCH repetition 310) and the communication 320 can be determined as one of the following: K−X, K−X+1, K−X−1, K+N−X+1 or K+N−X−1 slots, where X∈[0, N−1] or [1, N]. For another example, the time offset T between a PDCCH repetition 310 (such as, transmission or reception of the PDCCH repetition 310) and the communication 320 can be determined as one of the following: K+X, K+X+1 or K+X−1 slots, where X∈[0, N−1] or [1, N].

In some embodiments, the network device 110 may configure and/or indicate the time offset T to the terminal device 120 via any of the following: RRC signaling, MAC CE or DCI. For example, in response to receiving the configuration and/or indication of the time offset T, the terminal device 120 may ignore the offset value K indicated in DCI.

In some embodiments, the plurality of PDCCH repetitions (for example, B PDCCH repetitions) may be transmitted from the network device 110 to the terminal device 120 during the time duration D. For example, the time duration may include M slots, where M is an integer and 1≤M≤64. In some embodiments, the time offset T between a given PDCCH repetition (such as, transmission or reception of the given PDCCH repetition) and the communication can be determined as one of the following: K+X, K−X, K+X+1, K+X−1, K−X−1, K−X−1, K+M−X+1 or K+M−X−1 slots, where X represents a relative slot index within the M slots and K represents the offset value indicated in the PDCCH repetition. For example, X can be determined from the PDCCH DMRS initialization value $c_{init}$ as defined in the above formula (2):

$$c_{init} = (2^{17}(N_{symb}^{slot} n_{s,f}^{\mu} + l + 1)(2N_{ID} + 1)) \bmod 2^{31} \quad (2)$$

where l is the OFDM symbol number within the slot, and $n_{s,f}^{\mu}$ is the slot index within a frame or a sub-frame. For another example, X can be determined from the slot index $n_{slot}$ (where $n_{slot}$ is a non-negative integer and 0≤$n_{slot}$≤159) within the time duration D or the M slots or a frame or a sub-frame. In some embodiments, X can be determined as one of the following: M−($n_{slot}$+$N_{slot}$−$n_0$)mod$N_{slot}$−1, M−($n_{slot}$$N_{slot}$−$n_0$)mod$N_{slot}$+1, M−($n_{slot}$+$N_{slot}$−$n_0$)mod$N_{slot}$, ($n_{slot}$+$N_{slot}$−$n_0$)mod$N_{slot}$−1, ($n_{slot}$+$N_{slot}$−$n_0$)mod$N_{slot}$+1, or ($n_{slot}$+$N_{slot}$−$n_0$)mod$N_{slot}$. In some embodiments, $n_0$ may represent the slot index of the start one of the plurality of PDCCH repetitions (for example, $n_0$ indicates the slot in which transmission or reception of the start one of the plurality of PDCCH repetitions occurs). Alternatively, $n_0$ may represent the slot index of the 1st slot in the M slots. Alternatively, $n_0$ may represent the slot index within a frame or sub-frame. $n_{slot}$ represents the slot index for the given PDCCH repetition (for example, $n_{slot}$ indicates the slot in which transmission or reception of the given PDCCH repetition occurs), and $N_{slot}$ represents the number of slots per frame or per sub-frame. For example, $N_{slot} = N_{slot}^{frame, \mu}$, where $N_{slot}^{frame, \mu}$ represents the number of slots per frame. For another example, $N_{slot} = N_{slot}^{subframe, \mu}$, where $N_{slot}^{subframe, \mu}$ represents the number of slots per sub-frame. For example, $n_{slot} = n_s^{\mu}$ and $n_s^{\mu}$ is the slot number/index within a sub-frame. For another example, $n_{slot} = n_{s,f}^{\mu}$ and $n_{s,f}^{\mu}$ is the slot number/index within a frame. In some embodiments, for subcarrier spacing configuration μ, slots are numbered with $n_s^{\mu} \in \{0, \ldots, N_{slot}^{subframe, \mu} - 1\}$ in increasing order within a sub-frame and $n_{s,f}^{\mu} \in \{0, \ldots, N_{slot}^{frame, \mu} - 1\}$ in increasing order within a frame. For example, if μ=0 and/or the subcarrier spacing value is 15 kHz, then $N_{slot}^{subframe, \mu} = 1$, $n_s^{\mu} = 0$ $N_{slot}^{frame, \mu} = 10$ and/or 0≤$n_{s,f}^{\mu}$≤9. For another example, if μ=1 and/or the subcarrier spacing value is 30 kHz, then $N_{slot}^{subframe, \mu} = 2$, 0≤$n_s^{\mu}$≤1 $N_{slot}^{frame, \mu} 20$ and/or 0≤$n_{s,f}^{\mu}$≤19. For another example, if μ=2 and/or the subcarrier spacing value is 60 kHz, then $N_{slot}^{subframe, \mu} = 4$, 0≤$n_s^{\mu}$≤3, $N_{slot}^{frame, \mu} = 40$ and/or 0≤$n_{s,f}^{\mu}$≤39. For another example, if μ=3 and/or the subcarrier spacing value is 120 kHz, then $N_{slot}^{subframe, \mu} = 8$, 0≤$n_s^{\mu}$≤7, $N_{slot}^{frame, \mu} = 80$, and/or 0≤$n_{s,f}^{\mu}$≤79. For another example, if μ=4 and/or the subcarrier spacing value is 240 kHz, then $N_{slot}^{subframe, \mu} = 16$, 0≤$n_s^{\mu}$≤15, $N_{slot}^{frame, \mu} = 160$ and/or 0≤$n_{s,f}^{\mu}$≤159. For another example, if μ=5 and/or the subcarrier spacing value is 480 kHz, then $N_{slot}^{subframe, \mu} 32$, 0≤$n_s^{\mu}$≤31, $N_{slot}^{frame, \mu} 320$ and/or $0 \leq n_{s,f}^{\mu} \leq 319$. For another example, if μ5 or 6 and/or the subcarrier spacing value is 960 kHz, then $N_{slot}^{subframe, \mu}=64$, $0 \leq n_s^{\mu} \leq 63$, $N_{slot}^{frame, \mu}=640$, $0 \leq n_{s,f}^{\mu} \leq 639$. For another example, if μ=5 or 6 or 7 and/or the subcarrier spacing value is 1920 kHz, then $N_{slot}^{subframe, \mu}=128$, $0 \leq n_s^{\mu} \leq 127$, $N_{slot}^{frame, \mu}=1280$ and/or $0 \leq n_{s,f}^{\mu} \leq 1279$. For another example, if μ=5 or 6 or 7 or 8 and/or the subcarrier spacing value is 3840 kHz, then $N_{slot}^{subframe, \mu}=256$, $0 \leq n_s^{\mu} \leq 255$, $N_{slot}^{frame, \mu}=2560$ and/or $0 \leq n_{s,f}^{\mu} \leq 255$. In some embodiments, there are $N_{symb}^{slot}$ consecutive OFDM symbols in a slot, where $N_{symb}^{slot}$ depends on the cyclic prefix as given by the following Table 1, Table 2 and Table 3. The start of slot $n_s^{\mu}$ in a sub-frame is aligned in time with the start of OFDM symbol $n_s^{\mu} N_{symb}^{slot}$ in the same sub-frame.

TABLE 1

Number of OFDM symbols per slot, slots per frame, and slots per sub-frame for normal cyclic prefix.

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |
| 5 or 6 | 14 | 640 | 64 |
| 5, 6 or 7 | 14 | 1280 | 128 |
| 5, 6, 7 or 8 | 14 | 2560 | 256 |

TABLE 2

Number of OFDM symbols per slot, slots per frame, and slots per sub-frame for extended cyclic prefix.

| μ | $N_{symb}^{slot}$ | $N_{slot}^{frame, \mu}$ | $N_{slot}^{subframe, \mu}$ |
|---|---|---|---|
| 2 | 12 | 40 | 4 |

TABLE 3

Supported transmission numerologies.

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal or Extended |
| 3 | 120 | Normal |
| 4 | 240 | Normal |
| 5 | 480 | Normal or Extended |
| 5 or 6 | 960 | Normal or Extended |
| 5, 6 or 7 | 1920 | Normal or Extended |
| 5, 6, 7 or 8 | 3840 | Normal or Extended |

In response to determining the time offset T, the communication may be performed between the network device 110 and the terminal device 120 based on the determined time offset T. In some embodiments, the communication may be a DL communication. For example, the network device 110 may transmit 204 a signal to the terminal device 120 based on the determined time offset T. For example, the signal may include any of the following: a PDSCH signal, a ZP CSI-RS, an A-CSI-RS, an aperiodic ZP CSI-RS, a TRS, an aperiodic TRS or the like. In this event, the terminal device 120 may receive 204 the signal from the network device 110 based on the determined time offset T. Alternatively, in some embodiments, the communication may be a UL communication. For example, the terminal device 120 may transmit 204 a signal to the network device 110 based on the determined time offset T. For example, the signal may include any of the following: a PUSCH signal, a CSI report, an aperiodic CSI report, a HARQ feedback, a SRS, an aperiodic SRS or the like. In this event, the network device 110 may receive 204 the signal from the terminal device 120 based on the determined time offset T.

In some embodiments, the PDCCH repetitions transmitted from the network device 110 to the terminal device 120 may be used for scheduling PDSCH repetitions/transmissions/receptions/candidates. In some embodiments, for example, in the multi-TRP/multi-panel communication scenario as shown in FIG. 1B, the network device 110 may configure a plurality of transmission configuration indication (TCI) states to the terminal device 120 for multi-TRP/multi-panel communications. As used herein, a TCI state may indicate one Reference Signal (RS) set as well as parameters that configure quasi co-location (QCL) relationship between RSs within the RS set and DMRS ports for PDSCH. In some embodiments, different TCI states may be used for different PDCCH repetitions/transmissions/receptions and/or PDSCH repetitions/transmissions/receptions. In some embodiments, a TCI state used for the last one of the PDCCH repetitions/transmissions/receptions and a TCI state used for the start one of the PDSCH repetitions/transmissions/receptions may be QCLed with respect to some QCL type, may be the same, or may be associated with the same TRP. As such, the overhead of beam switching for the PDCCH repetitions and PDSCH repetitions can be reduced.

In some embodiments, if the terminal device 120 is configured with the higher layer parameter tci-PresentInDCI that is set as 'enabled' for the Control Resource Set (CORESET) scheduling the PDSCH, the terminal device 120 may assume that the TCI field is present in the DCI of the PDCCH transmitted on the CORESET. If tci-PresentInDCI is not configured for the CORESET scheduling the PDSCH or the PDSCH is scheduled by DCI format 1_0, and if the time offset between the reception of the DCI or the last PDCCH potential repetition/candidate within the time duration D, the M slots or the B repetitions and the corresponding PDSCH is equal to or greater than a threshold timeDurationForQCL if applicable, where the threshold is based on the reported UE capability, in order to determine PDSCH antenna port quasi co-location, the terminal device 120 may assume that the TCI state or the QCL assumption for the PDSCH is identical to the TCI state or QCL assumption whichever is applied for the CORESET used for the PDCCH transmission.

In some embodiments, if the tci-PresentInDCI is set as 'enabled', the TCI field in DCI in the scheduling component carrier points to the activated TCI states in the scheduled component carrier or DL Bandwidth Part (BWP) and if the PDSCH is scheduled by DCI format 1_1, the terminal device 120 may use the TCI-State according to the value of the 'Transmission Configuration Indication' field in the detected PDCCH with DCI for determining PDSCH antenna port quasi co-location. The terminal device 120 may assume that the DMRS ports of PDSCH of a serving cell are quasi co-located with the RS(s) in the TCI state with respect to the QCL type parameter(s) given by the indicated TCI state, if the time offset between the reception of the DCI or the last PDCCH potential repetition/candidate the time duration D, the M slots or the B repetitions and the corresponding PDSCH is equal to or greater than a threshold timeDurationForQCL, where the threshold is based on the reported UE capability. When the terminal device 120 is configured with a single slot PDSCH, the indicated TCI state should be based on the activated TCI states in the slot with the scheduled PDSCH. When the terminal device 120 is configured with a multi-slot PDSCH, the indicated TCI state should be based on the activated TCI states in the slot with the scheduled PDSCH, and the terminal device 120 may expect the activated TCI states are the same across the slots with the scheduled PDSCH. When the terminal device 120 is configured with a CORESET associated with a search space set for cross-carrier scheduling, the terminal device 120 may expect tci-PresentInDci is set as 'enabled' for the CORESET; and if one or more of the TCI states configured for the serving cell scheduled by the search space set contains 'QCL-TypeD', the terminal device 120 may expect that the time offset between the reception of the detected PDCCH or the last PDCCH potential repetition/candidate within the time duration D, the M slots or the B repetitions in the search space set and the corresponding PDSCH is greater than or equal to the threshold timeDurationForQCL.

In some embodiments, for both the cases where tci-PresentInDCI is set to 'enabled' and where tci-PresentInDCI is not configured in RRC connected mode, if the offset between the reception of the DCI or the last PDCCH potential repetition/candidate within the time duration D, the M slots or the B repetitions and the corresponding PDSCH is below the threshold timeDurationForQCL, the terminal device 120 may assume that the DMRS ports of PDSCH of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the terminal device 120.

Figure 4:
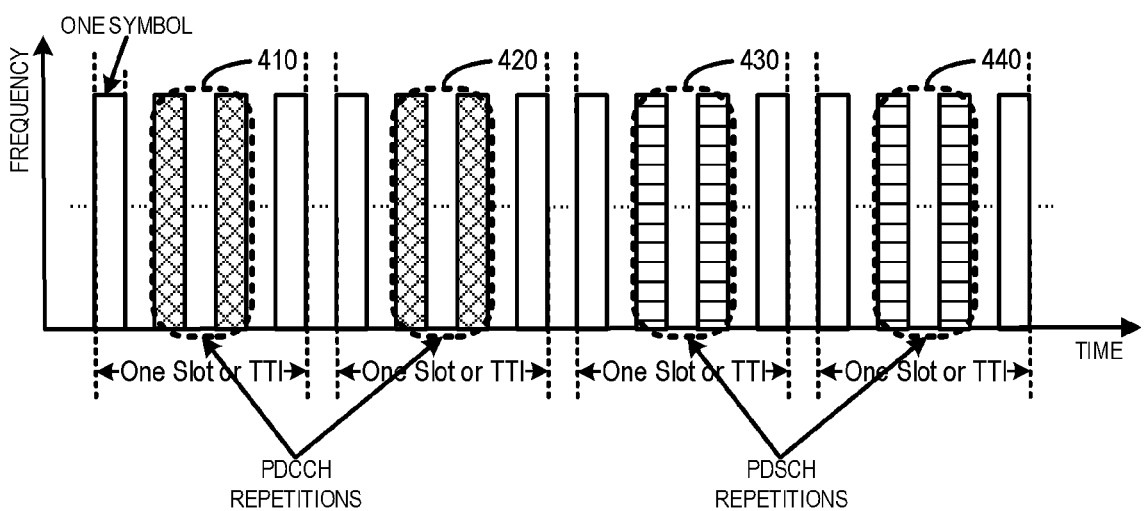
FIG. 4 illustrates an example of embodiments of the present disclosure.

FIG. 4 illustrates an example of such embodiments. As shown in FIG. 4, for example, the network device 110 may transmit, to the terminal device 120, PDCCH repetitions 410 and 420 for scheduling PDSCH repetitions 430 and 440. It is assumed that TCI state A is used for the PDCCH repetition 410, TCI state B is used for the PDCCH repetition 420, TCI state C is used for the PDSCH repetition 430 and TCI state D is used for the PDSCH repetition 430. In some embodiments, the TCI states B and C may be QCLed with respect to some QCL type, or may be associated with the same TRP, so as to reduce the overhead of beam switching for the PDCCH repetition 420 and the PDSCH repetition 430.

In view of the above, it can be seen that embodiments of the present disclosure enable both the network device and the terminal device to obtain, from the PDCCH repetitions, the real time offset for a corresponding communication between the network device and the terminal device. Since the payloads of different PDCCH repetitions are the same, the combination of PDCCH repetitions can be achieved, so as to improve reliability and robustness for the PDCCH.

Figure 5:
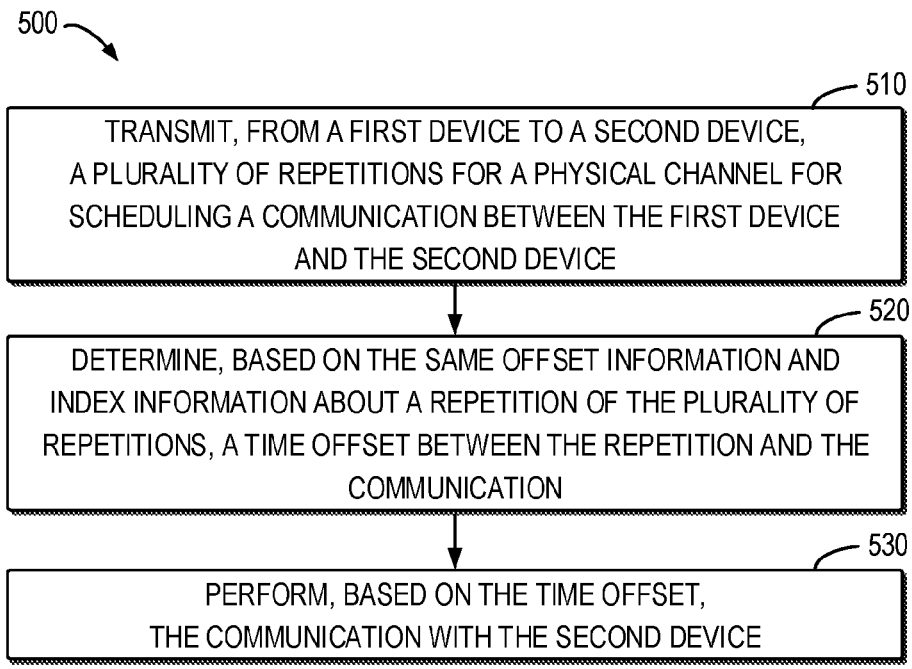
FIG. 5 illustrates a flowchart of an example method in accordance with some embodiments of the present disclosure.

FIG. 5 illustrates a flowchart of an example method 500 in accordance with some embodiments of the present disclosure. The method 500 can be performed at the first device 210 as shown in FIG. 2. It is to be understood that the method 500 may include additional blocks not shown and/or may omit some blocks as shown, and the scope of the present disclosure is not limited in this regard.

At block 510, the first device 210 transmits, to the second device 220, a plurality of repetitions for a physical channel for scheduling a communication between the first device 210 and the second device 220. The plurality of repetitions may indicate same offset information for the communication.

At block 520, the first device 210 determines, based on the same offset information and index information about a repetition of the plurality of repetitions, a time offset between the repetition and the communication.

At block 530, the first device 210 performs, based on the time offset, the communication with the second device 220.

In some embodiments, performing the communication with the second device comprises: transmitting, based on the time offset, a signal to the second device.

In some embodiments, the physical channel is a PDCCH, and the signal comprises one of the following: a PDSCH signal; a CSI-RS; or a TRS.

In some embodiments, performing the communication with the second device comprises: receiving, based on the time offset, a signal from the second device.

In some embodiments, the physical channel is a PDCCH, and the signal comprises one of the following: a PUSCH signal; a CSI report; a HARQ feedback; or a SRS.

In some embodiments, the method 500 further comprises: determining an index of the repetition within the plurality of repetitions; and determining, based on the index, the index information about the repetition.

In some embodiments, the plurality of repetitions for the physical channel are transmitted from the first device to the second device during a plurality of slots and the repetition is transmitted from the first device to the second device in a slot of the plurality of slots. The method 500 further comprises: determining a relative index of the slot within the plurality of slots; and determining, based on the relative index, the index information about the repetition.

In some embodiments, the plurality of repetitions are transmitted from the first device to the second device in a frame or sub-frame and the repetition is transmitted from the first device to the second device in a slot of the frame or sub-frame. The method 500 further comprises: determining an index of the slot within the frame or sub-frame; and determining, based on the index, the index information about the repetition.

In some embodiments, the physical channel comprises one of the following: a PDCCH; a PDSCH; a PUCCH; a PUSCH; or a PRACH.

Figure 6:
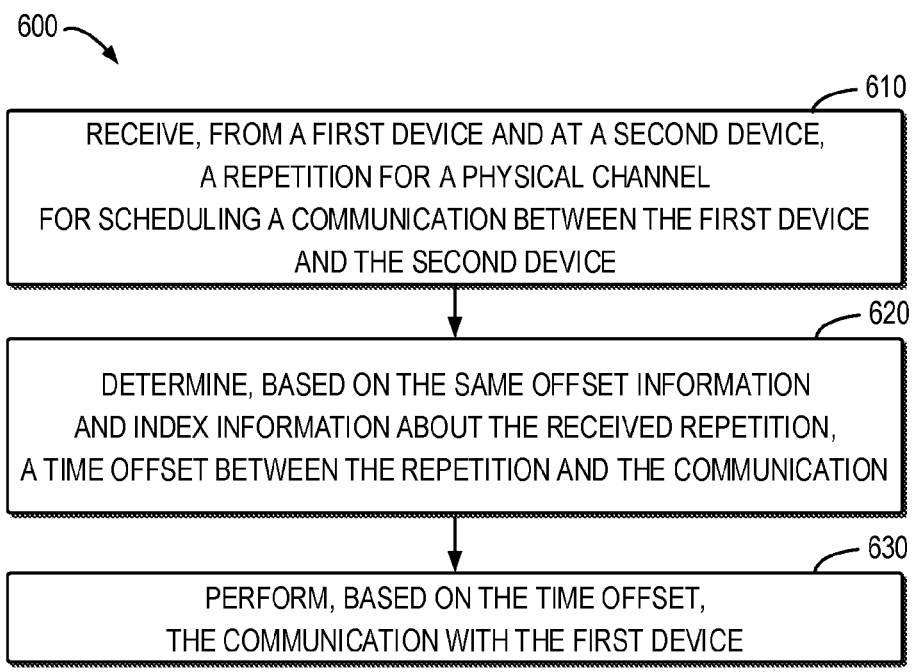
FIG. 6 illustrates a flowchart of an example method in accordance with some embodiments of the present disclosure.

FIG. 6 illustrates a flowchart of an example method 600 in accordance with some embodiments of the present disclosure. The method 600 can be performed at the second device 220 as shown in FIG. 2. It is to be understood that the method 600 may include additional blocks not shown and/or may omit some blocks as shown, and the scope of the present disclosure is not limited in this regard.

At block 610, the second device 220 receives, from the first device 210, a repetition for a physical channel for scheduling a communication between the first device 210 and the second device 220. The first device 210 may transmit a plurality of repetitions for the physical channel to the second device 220, and the plurality of repetitions comprise the received repetition and indicate same offset information for the communication.

At block 620, the second device 220 determines, based on the same offset information and index information about the repetition, a time offset between the repetition and the communication.

At block 630, the second device 220 performs, based on the time offset, the communication with the first device 210.

In some embodiments, performing the communication with the first device comprises: receiving, based on the time offset, a signal from the first device.

In some embodiments, the signal comprises one of the following: a PDSCH signal; a CSI-RS; or a TRS.

In some embodiments, performing the communication with the first device comprises: transmitting, based on the time offset, a signal to the first device.

In some embodiments, the signal comprises one of the following: a PUSCH signal; a CSI report; a HARQ feedback; or a SRS.

In some embodiments, the method 600 further comprises: determining an index of the repetition within the plurality of repetitions; and determining, based on the index, the index information about the repetition.

In some embodiments, the plurality of repetitions for the physical channel are to be received from the first device during a plurality of slots and the repetition is received from the first device in a slot of the plurality of slots. The method 600 further comprises: determining a relative index of the slot within the plurality of slots; and determining, based on the relative index, the index information about the repetition.

In some embodiments, the plurality of repetitions are to be received from the first device in a frame or sub-frame and the repetition is received from the first device in a slot of the frame or sub-frame. The method 600 further comprises: determining an index of the slot within the frame or sub-frame; and determining, based on the index, the index information about the repetition.

In some embodiments, the physical channel comprises one of the following: a PDCCH; a PDSCH; a PUCCH; a PUSCH; or a PRACH.

Figure 7:
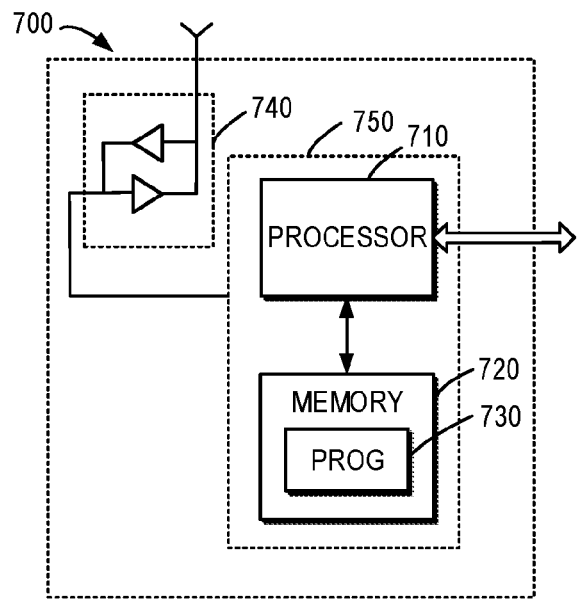
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the first device 210 or the second device 220 as shown in FIG. 2. Accordingly, the device 700 can be implemented at or as at least a part of the first device 210 or the second device 220.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1A to 6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 5 and/or FIG. 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a base station, the method comprising:
   transmitting, to a User Equipment (UE), a downlink control information (DCI) format within at least one each of two Physical Downlink Control Channel (PDCCH) candidates for repetition,
      wherein the two PDCCH candidates for repetition are transmitted in one slot,
      wherein the two PDCCH candidates for repetition include a first PDCCH candidate that starts from a first starting symbol, and a second PDCCH candidate that starts from a second starting symbol, which is later in time than the first starting symbol,
      wherein a first Control Resource set (CORESET) for the first PDCCH candidate is associated with a first Transmission Configuration Indicator (TCI) state or a first quasi co-location (QCL) assumption, and a second CORESET for the second PDCCH candidate is associated with a second TCI state or a second QCL assumption, and
      wherein a starting symbol for a Physical Downlink Shared Channel (PDSCH), which is defined relative to the second starting symbol, is based on the DCI format; and
   transmitting the PDSCH based on one of the first TCI state and the second TCI state, or one of the first QCL assumption and the second QCL assumption, to the UE.

2. The method of claim 1, wherein each DCI format within each of the two PDCCH candidates comprises same respective information indicating an offset for the PDSCH.

3. The method of claim 1, wherein a time offset between the second PDCCH candidate and the PDSCH is compared with a value of timeDurationForQCL by the UE.

4. The method of claim 3, wherein the DCI format is without a TCI field and the time offset is equal to or larger than a value of timeDurationForQCL.

5. The method of claim 3, wherein, in a case where the DCI format has a TCI field and the time offset is equal to or larger than a value of timeDurationForQCL, Demodulation Reference Signal (DMRS) ports of the PDSCH are assumed to be quasi co-located with Reference Signal(s) (RS(s)) in a TCI state with respect to Quasi co-location (QCL) type parameter(s) given by a TCI state indicated by the TCI field.

6. A method of communication performed by a User Equipment (UE), the method comprising:
   receiving, from a base station, a downlink control information (DCI) format within at least one of two Physical Downlink Control Channel (PDCCH) candidates for repetition,
      wherein the two PDCCH candidates for repetition are transmitted in one slot,
      wherein the two PDCCH candidates for repetition include a first PDCCH candidate that starts from a first starting symbol, and a second PDCCH candidate that starts from a second starting symbol, which is later in time than the first starting symbol, and
      wherein a first Control Resource set (CORESET) for the first PDCCH candidate is associated with a first Transmission Configuration Indicator (TCI) state or a first quasi co-location (QCL) assumption, and a second CORESET for the second PDCCH candidate is associated with a second TCI state or a second QCL assumption;
   determining, based on the DCI format, a starting symbol for a Physical Downlink Shared Channel (PDSCH), which is defined relative to the second starting symbol; and
   receiving the PDSCH based on one of the first TCI state and the second TCI state, or one of the first QCL assumption and the second QCL assumption, from the base station.

7. The method of claim 6, wherein each DCI format within each of the two PDCCH candidates comprises same respective information indicating an offset for the PDSCH.

8. The method of claim 6, further comprising:
   comparing a time offset between the second PDCCH candidate and the PDSCH with a value of timeDurationForQCL.

9. The method of claim 8, wherein the DCI format is without a TCI field and the time offset is equal to or larger than the value of timeDurationForQCL.

10. The method of claim 8, further comprising:
    in a case where the DCI format has a TCI field and the time offset is equal to or larger than the value of timeDurationForQCL, assuming that the Demodulation Reference Signal (DMRS) ports of the PDSCH are quasi co-located with Reference Signal(s) (RS(s)) in a TCI state with respect to QCL type parameter(s) given by a TCI state indicated by the TCI field.

11. A User Equipment (UE), comprising:

at least one memory configured to store program instructions;

at least one processor configured to execute the program instructions to perform a method comprising:

receiving, from a base station, a downlink control information (DCI) format within at least one of two Physical Downlink Control Channel (PDCCH) candidates for repetition, wherein the two PDCCH candidates for repetition are transmitted in one slot, wherein the two PDCCH candidates for repetition include a first PDCCH candidate that starts from a first starting symbol, and a second PDCCH candidate that starts from a second starting symbol, which is later in time than the first starting symbol, and wherein a first Control Resource set (CORESET) for the first PDCCH candidate is associated with a first Transmission Configuration Indicator (TCI) state or a first quasi co-location (QCL) assumption, and a second CORESET for the second PDCCH candidate is associated with a second TCI state or a second QCL assumption;

determining, based on the DCI format, a starting symbol for a Physical Downlink Shared Channel (PDSCH), which is defined relative to the second starting symbol; and receiving the PDSCH based on one of the first TCI state and the second TCI state, or one of the first QCL assumption and the second QCL assumption, from the base station.

12. The UE of claim 11, wherein each DCI format within each of the two PDCCH candidates comprises same respective information indicating an offset for the PDSCH.

13. The UE of claim 11, wherein the method further comprises:

comparing a time offset between the second PDCCH candidate and the PDSCH with a value of timeDurationForQCL.

14. The UE of claim 13, wherein the DCI format is without a TCI field and the time offset is equal to or larger than the value of timeDurationForQCL.

15. The UE of claim 14, wherein, in a case where the DCI format has a TCI field and the time offset is equal to or larger than the value of timeDurationForQCL, assuming that the Demodulation Reference Signal (DMRS) ports of the PDSCH are quasi co-located with Reference Signal(s) (RS(s)) in a TCI state with respect to QCL type parameter(s) given by a TCI state indicated by the TCI field.

* * * * *